Sept. 13, 1927.
C. E. BILLINGS
1,642,138
CLOSURE MEMBER FOR RECEPTACLES OR THE LIKE
Filed Nov. 19, 1921
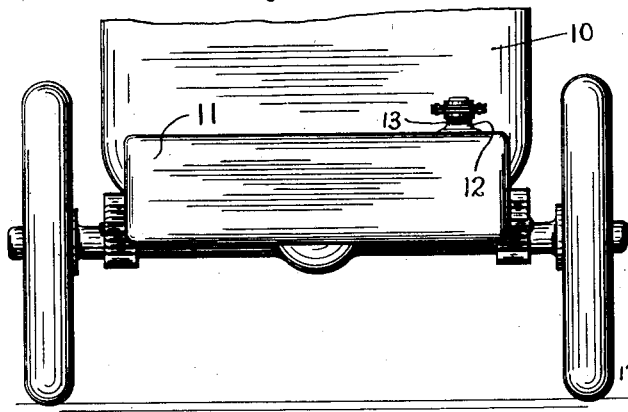
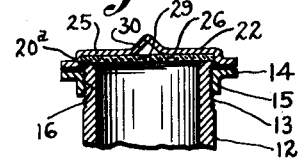
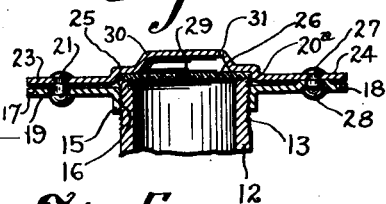
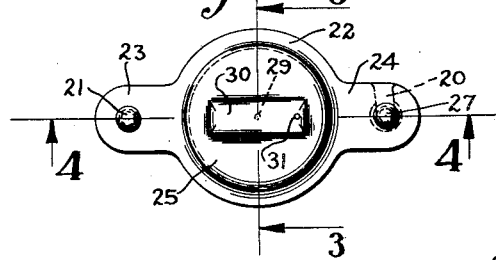
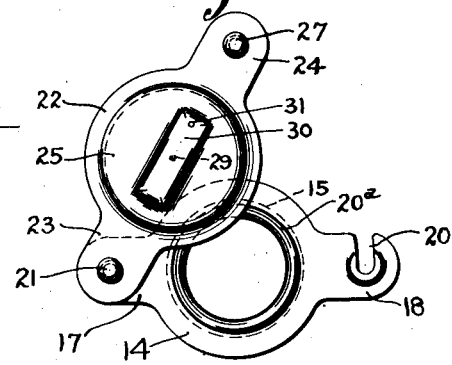
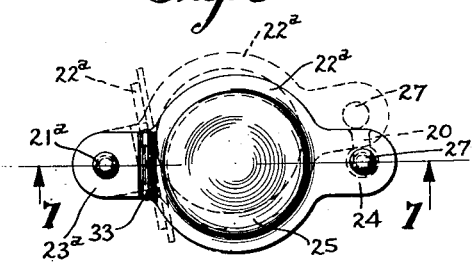
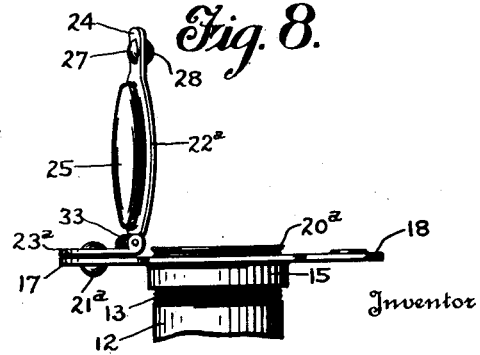
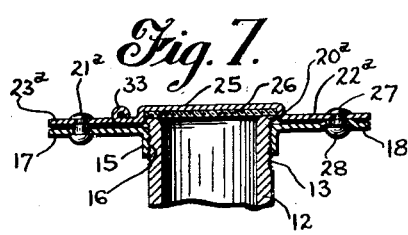
Inventor
James E. Billings
By Henry E. Rockwell
Attorney Patented Sept. 13, 1927.

1,642,138

UNITED STATES PATENT OFFICE.

CLARENCE E. BILLINGS, OF NEW HAVEN, CONNECTICUT.

CLOSURE MEMBER FOR RECEPTACLES OR THE LIKE.

Application filed November 19, 1921. Serial No. 516,422.

This invention relates to closure members for receptacles or the like and, more especially to a filler cap adapted to be used upon the gasoline tank or the radiator of an automobile. It will, of course, be obvious that my improvements are not limited, however, to use in connection with automobiles, but may be used upon receptacles of any character.
It is common to provide the gas tanks and radiators of automobiles with the usual threaded filler cap adapted to be engaged upon a threaded neck or nipple secured to the receptacle. These caps are often insecurely applied to the receptacle and hence become lost. Or, in other cases, the threads are not properly engaged and the cap is forced on and thus the threads are so mutilated that a proper engagement cannot be effected thereafter.

Generally speaking, my invention has for its object the overcoming of the disadvantages pointed out above and the provision of a filler cap which, while permanently connected to the receptacle, may be easily and conveniently moved to a position to expose the opening therein and just as easily and conveniently closed.

Another object of my invention is to provide a filler cap which is rotatable to a position in which it will tightly engage the filler neck of the receptacle and which will at the same time be prevented from complete disengagement with the threads thereof.
A still further object of my invention is the provision of a filler cap for a tank or receptacle which may be swung bodily to a position above the neck of the receptacle, and thereafter caused to be moved into tight engagement with this neck by a partial rotation thereof.

To these and other ends my invention consists in the novel features and combination of parts to be hereinafter described and claimed.

In the accompanying drawings:

Fig. 1 is a rear elevational view of an automobile shown in a conventional way, having a gas tank provided with a closure member embodying my improvements;

Fig. 2 is a top plan view of the closure member removed from the receptacle;

Fig. 3 is a sectional view through the filler cap or closure member when applied to the filler neck of the receptacle taken on line 3—3 of Fig. 2;

Fig. 4 is a sectional view similar to Fig. 3 taken on line 4—4 of Fig. 2;

Fig. 5 is a top plan view showing the cover member swung to a position to permit access to the filler opening;

Fig. 6 is a top plan view of a slightly modified form of my invention;

Fig. 7 is a sectional view on line 7—7 of Fig. 6; and

Fig. 8 is a side elevational view showing the cover swung to open position.

To illustrate one application of a preferred embodiment of my invention, I have shown, in a conventional way, the rear end of an automobile at 10, having mounted thereon a gas tank 11 provided with a suitable filler neck or nipple 12, through which the receptacle is adapted to be filled. The nipple 12 is, as shown in Figs. 3 and 4, provided in this instance with external threads 13 near the upper end of the same.

In the construction of a preferred embodiment of my invention, I prefer to provide a base member 14, having an intermediate collar 15 internally threaded at 16, to operatively engage the threads 13 upon the filler neck. This base member is provided with wings 17 and 18, one of which is provided with a perforation 19, and the other with an open ended slot 20. The open ended slot 20 terminates substantially centrally in the wing 18 in a semi-circular opening about which a circular depression or counter-sink 18$^a$ is formed, the use of which will be explained later. This base member is preferably threaded upon the filler cap and prevented from removal therefrom in some suitable way, such as by mutilating the threads 13 above the upper edge of the member. This is done in the form shown by slightly expanding the upper edge 20$^a$ of the filler neck 13.

Hinged to this base member 14 by a pivot pin or rivet 21 passing through the perforation 19 in the wing 17 is a cover 22, similar in shape to that of the member 14, in that it is provided with wings 23 and 24. Between these wings the body portion of the cover is slightly crowned at 25 to fit over the upper end of the filler neck and to provide for the positioning of a washer or gasket 26 of leather or other suitable material, and of disk shape between the upper edge of the filler neck and the lower surface of the crown portion 25 of the cover in order to make a tight joint. The wing 24 of the cover is provided with a rivet or similar securing member 27 which is adapted to be received in the slot 20 when the cover member is swung to closed position as shown in Figs. 2 and 4, and which is provided with a head or enlargement 28 upon its lower end to engage below the edges of this slot and to fit within the depression or the counter-sink 18ª.

If it is necessary to admit air to the receptacle, provision may be made for this purpose by the arrangement of a small opening 29 in the gasket 26, and the crown portion 25 of the cover may be provided with a hollow boss 30 pierced at 31 to permit the passage of air therethrough. The boss 30 will also be found to be ornamental in appearance. If desired, the disklike washer may be secured within the cover by any suitable means, such as by cementing the upper surface of the washer to the lower surface of the crown portion 25 of the cover.

When the cover is in the position shown in Fig. 5, it will be apparent that the opening through the filler neck will be exposed so that the receptacle may be filled. When it is desired to close this opening, the cover is swung to the position shown in Fig. 2, the rivet 27 engaging somewhat loosely within the slot 20 as the body of the rivet is slightly longer than the combined thickness of the wings 18 and 24. If now the entire closure member is given a partial rotation upon the threads 13 in a direction to move the member downwardly relative to the neck, the upper edge 20ª of the neck will be moved into engagement with the washer 26 and will tend to crowd the cover 22 upwardly so as to exert a tension upon the rivets 21 and 27 which causes the enlargement or head 28 of the rivet 27 to be nested into the counter-sink or depression 18ª whereby the two parts 14 and 22 are automatically locked together. The closure member will now be held tightly upon the filler neck so that not only will the movement from the closed position in Fig. 2 to the open position shown in Fig. 5 be prevented due to the head 28 of the rivet 27 not being able to become released laterally through the slot 20 because of its engagement within the depression 18ª, but also the leather washer being tightly pressed against the upper edge 20ª of the filler neck will effectually seal the receptacle to prevent the escape of the liquid contents therefrom. With the provision of the openings 29 and 31, a sufficient quantity of air will be allowed admission to the receptacle, but the escape of the receptacle contents through these openings will not be permitted. To open the receptacle, the closure member is first given a partial rotation to the left which will tend to loosen the cover member 22 upon the base member 14 by releasing the tension upon the rivets 21 and 27, respectively, so that the head 28 is freed from engagement within the counter-sink 18ª and the parts 22 and 14 are released from the locked position so that the former may thereafter be swung to its open position shown in Fig. 5. It may be noted that while my closure member is permanently secured to the receptacle, it nevertheless is rotatably secured thereto and its closure is effected first by a pivotal or swinging movement of the cover member and thereafter by a movement of rotation of the same.

In Figs. 6, 7 and 8 I have shown a slightly modified form of my invention in which the cover member 22ª is hinged at 33 to one of the wings 23ª. In this case the cover member 22ª and the base member 14 must first be rotated to relieve the tension upon the rivets 21ª and 27, so as to release the head 28 from the depression 18ª and then the cover member 22ª must be slightly swung about its pivot 21ª to the dotted line position shown in Fig. 6 where the pin 27 clears the slot 20. The opening of the receptacle may then be accomplished by swinging the cover upwardly about the hinge 33, as shown in Fig. 8. Such an arrangement may sometimes be found advantageous in positions where a swinging movement of the cover, such as shown in Fig. 5, might be prevented by contiguous parts of the structure upon which the cap is mounted. Moreover, the modification shown in Figs. 6 to 8 is not provided with the boss 30, as the washer 26 in this instance is not provided with an opening to admit air. If the closure is used, for instance, upon a radiator tank, such an opening is unnecessary, and hence the hollow boss 30 may also be omitted.

While I have shown and described a preferred embodiment of my invention, it is understood that it is not to be limited to the exact details shown, but is capable of many modifications and variations which lie within the spirit of the invention and within the scope of the appended claims.

It will be apparent that means other than the rivet 27 and associated parts may be used to connect the wing 24 of the closure member to the wing 18 of the base member, and such means may be arranged particularly in the form shown in Figs. 6 to 8 of the drawings so that any lateral movement of the cap about the rivet 21ª is unnecessary, it being possible to simply swing the cover about the hinge 33 into a position directly above the filler neck and then rotate the members to effect a tight engagement thereof. Therefore, when reference is made in this application to a closure member swingable to position above the filler neck and then rotatable into tight engagement therewith, such expressions may refer either to the lateral swinging of the cap about the rivet 21 in the form of my invention shown in Figs. 1 to 5 or the vertical swinging of the cover about the hinge 33 as shown in the form of my invention illustrated in Figs. 6 to 8.

What I claim is:

1. In a closure structure for receptacles, a filler neck and a filler cap mounted on said neck comprising two relatively movable parts, headed members connecting the parts, and means to press said parts adjacent the heads of the members by a rotation of the cap on the neck, one of said headed members co-operating with one of said parts whereby said parts are locked against relative movement when pressed against said heads.

2. In a closure structure for receptacles, a filler cap comprising two relatively movable parts adapted to be locked against relative movement by exerting pressure on one of them in a direction away from the other, one of said parts having a threaded socket, in combination with a threaded filler neck engaging said socket and adapted to project through it into impingement with the other part of the cap for producing the aforesaid pressure, and means to prevent disengagement of the socketed part of said cap from the neck threads.

In witness whereof, I have hereunto set my hand on this 17 day of November, 1921.

CLARENCE E. BILLINGS.